March 27, 1951   A. KRUSHELNICKY   2,546,191
TRIP-ROPE RELEASING DEVICE
Filed Feb. 28, 1950
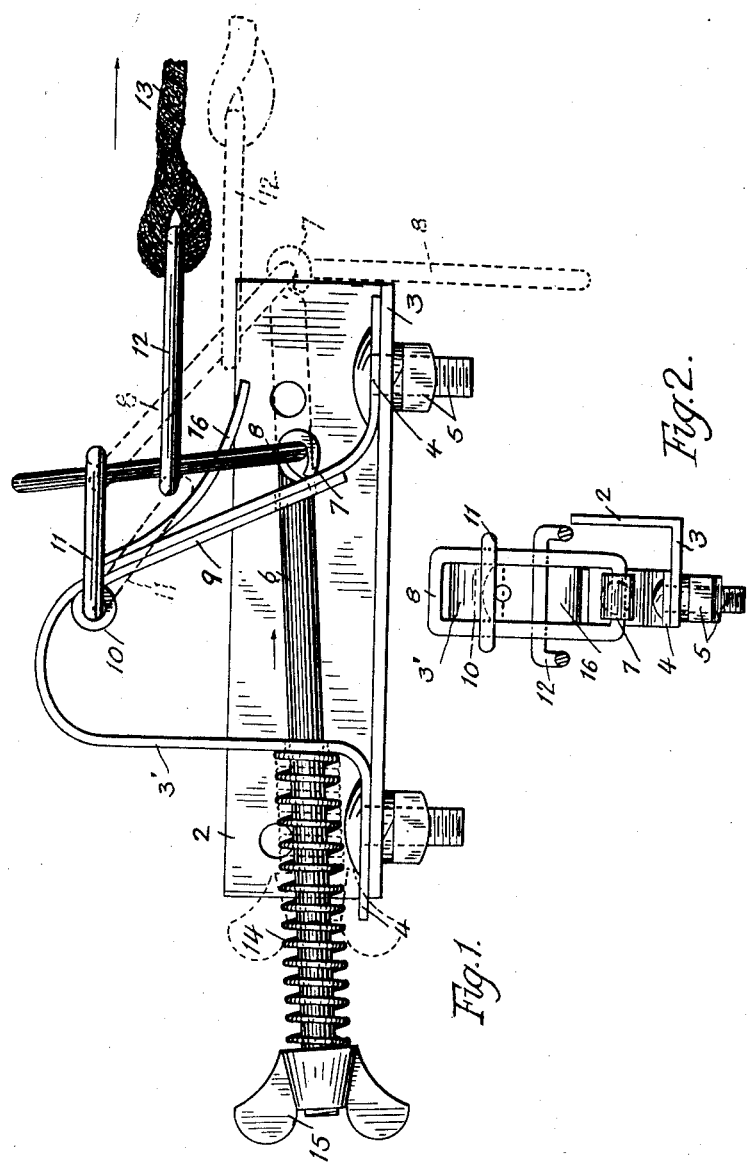
Inventor
Adam Krushelnicky
By Egerton R. Case,
Attorney

Patented Mar. 27, 1951

2,546,191

UNITED STATES PATENT OFFICE 2,546,191

TRIP-ROPE RELEASING DEVICE

Adam Krushelnicky, Indian Head,
Saskatchewan, Canada

Application February 28, 1950, Serial No. 146,668

2 Claims. (Cl. 280—150)

This invention relates to a trip-rope releasing device, and the objects of the invention are:

1. To provide a device of this class that can be attached to the inside of either fender of a tractor, and which will automatically detach itself from the trip-rope of the agricultural implement towed by the tractor in case of need to prevent the rope being broken.

2. To provide a sturdy device which is positive in action, and which can be readily reset without the use of any tools.

Figure 1 is a side elevation of the device assumed to be attached to the inside of the right fender (not shown) of a tractor with the trip-rope coupled to a plough (not shown).

Figure 2 is an elevation, on a reduced scale, of the right-hand end of Figure 1, without the trip-rope.

In the drawings, like characters of reference refer to the same parts.

The device comprises, preferably, a bracket L-shaped in cross section, the vertical flange 2, of which is adapted to be suitably attached to either fender of the truck (not shown). To the horizontal flange 3, of said bracket an inverted U-shaped frame 3', is attached. This frame is provided at its lower part with outwardly-flared flanges 4, which are coupled to the flange 3 in any suitable manner. Nuts and bolts 5, are shown for this purpose.

The pull-rod 6, is slidably held in the frame 3', and the rear end thereof is on the outer side of said frame. This rear end is in the form of an I 7, in which is pivoted the link 8. Suitably secured to the inside of the frame 3, as by brazing, is a plate 9, the upper end of which is in the form of an I 10, in which is pivoted the link 11. The pull rod slides through the plate 9, which latter strengthens the rear side of the frame 3.

In the position of the parts shown in full lines in Figure 1, the link 8, passes through the link 11, and the hitching link 12, to which is coupled the trip-rope 13, coupled to the implement (not shown) being towed.

When the towed implement is released, or a draw-pin breaks, the rope 13, is made taut. In due course the pull on the rope in the direction of arrow causes the hitching link 12, to exert a pull on the link 8, and the pull-rod 6. During this application of force, the link 8, is fulcrummed on the link 11, with the result that the link 8, as the pull-rod continues its movement, escapes from the link 11, with the result that the hitching link 12, slides from over the link 8, and thus uncouples the trip-rope 13, from the device. The dotted positions of certain of the parts shown in Figure 1, show the positions thereof at the time the trip-rope is disconnected from the device. Obviously when the hitching link 12, is released from the link 8, the link 12, and its rope will drop onto the ground.

As the pull-rod 6, is being moved rearwardly during the release of the trip-rope and its link 12, from the device, the spiral spring 14, mounted on the said rod between the frame 3', and the nut 15, is compressed thus storing up energy to immediately return the pull-rod to normal position after the hitching link 12 has been released.

The plate 16, suitably coupled to the outer side of the rear side of the frame 3', acts as a guard to prevent the link 12, from fouling the rod 6. The plate 16, is curved rearward of the frame 3', thus deflecting the link 12, from the rod 6, as the device is sprung.

Changes in construction without changing the principle of the invention may be made without departing from the scope of protection as defined by the claims.

I claim:

1. A trip-rope releasing device comprising a suitable support adapted to be detachably attached to a tractor; a U-shaped frame detachably secured in a vertical position on said support; a pull-rod slidably mounted in said frame longitudinally of said support and projecting beyond each side of said frame, the rear end having an eye formed therein; a spiral spring on the forward portion of said rod; a nut on said rod adapted to keep said spring in contact with said frame; a link pivoted on said frame near the upper end thereof and extending rearwardly of the frame; a link pivoted in the eye of the said pull-rod and normally passing through said other link in engagement therewith; a hitching link through which said second-mentioned link normally extends in contact therewith; a rearwardly-curved plate carried by said frame to extend below the hitching link to divert this link rearwardly when the device is sprung, and a trip-rope coupled to said hitching link.

2. A trip-rope releasing device comprising a bracket L-shaped in cross section; a U-shaped frame detachably secured to the horizontal flange of said bracket; a pull-rod slidably mounted in said bracket longitudinally thereof and projecting beyond each side of said bracket, the rear end having an eye formed therein; a spiral spring on the forward portion of said rod; a nut on said rod adapted to keep said spring in contact with said frame; a link pivoted on said frame near the upper end thereof and extending rearwardly of the frame; a link pivoted in the eye of the said pull-rod and normally passing through said other link in engagement therewith; a hitching link through said second-mentioned link normally in contact therewith; a rearwardly-curved plate carried by said frame to extend below the hitching link to divert this link rearwardly when the device is sprung, and a trip-rope coupled to said hitching link.

ADAM KRUSHELNICKY.

REFERENCES CITED

The following references are of record in the file of this patent:

UNITED STATES PATENTS

| Number | Name | Date |
|---|---|---|
| 1,294,696 | Over | Feb. 18, 1919 |
| 1,384,195 | Hulsebos | July 12, 1921 |
| 2,478,124 | Mussman | Aug. 2, 1949 |